(12) United States Patent
Hamami

(10) Patent No.: US 6,182,193 B1
(45) Date of Patent: Jan. 30, 2001

(54) CACHING SYSTEM USING CACHE INDEXES FOR CALL GROUP DATA OF CALL REQUESTS IN ATM NETWORK DEVICES

(75) Inventor: Ilan Hamami, Tel Aviv (IL)

(73) Assignee: 3Com Corporation, Santa Clara, CA (US)

( * ) Notice: Under 35 U.S.C. 154(b), the term of this patent shall be extended for 0 days.

(21) Appl. No.: 09/085,766

(22) Filed: May 28, 1998

(51) Int. Cl.[7] .............................. G06F 12/08; G06F 13/00
(52) U.S. Cl. .......................... 711/119; 711/118; 711/154; 370/395
(58) Field of Search ..................... 711/118, 119, 711/154; 370/395, 412, 382, 383; 709/227

(56) References Cited

U.S. PATENT DOCUMENTS

| | | | |
|---|---|---|---|
| 5,483,536 | 1/1996 | Gunji et al. | 370/85.14 |
| 5,550,818 | 8/1996 | Brackett et al. | 370/60 |
| 5,566,014 | 10/1996 | Glance | 359/124 |
| 5,909,446 | * 6/1999 | Horikawa et al. | 370/469 |
| 5,914,956 | * 6/1999 | Williams | 370/395 |
| 5,953,316 | * 9/1999 | Lazar et al. | 370/230 |
| 5,978,951 | * 11/1999 | Lawler et al. | 714/758 |
| 5,987,516 | * 11/1999 | Rao et al. | 709/227 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking,* vol. 4, No. 1, Feb. 1996, pp. 86–97.

Williams, K.A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

*Primary Examiner*—Eddie P. Chan
*Assistant Examiner*—Hong Kim
(74) *Attorney, Agent, or Firm*—Howard Zaretsky; David J. Weitz; Wilson Sonsini Goodrich & Rosati

(57) ABSTRACT

A signaling cache suitable for use in networks, such as ATM networks, that utilize signaling in establishing calls. The invention functions to greatly reduce the amount of call processing required for calls that have been previously received and processed by the switch. The signaling cache can be implemented on each switch in the network to reduce the processing requirements network wide. Each switch along the call route functions to perform signaling processing only once for each unique call request. The results of the signaling processing are stored in a cache memory to enable re-use in the event a call request is receive that matches a previously received and processed call request. Signaling processing is performed for each request message having a particular set of characteristics, e.g., a set of IEs having a particular value. Anytime thereafter, when a signaling request having the same characteristics is received, the signaling process is bypassed and the results fetched from the cache memory. The signaling cache of the present invention can be applied to other related processes including routing, resource allocation, etc.

11 Claims, 6 Drawing Sheets

| | IE #1 | IE #2 | ... | IE #M | CACHE INDEX |
|---|---|---|---|---|---|
| ENTRY #1 | | | | | |
| | ... | ... | ... | ... | ... |
| ENTRY #L | | | | | |

| | HIT INDICATION/ NULL | SIGNALING PROCESSING RESULTS | CACHE INDEX PORT #1 | CACHE INDEX PORT #2 | ... | CACHE INDEX PORT #N |
|---|---|---|---|---|---|---|
| ENTRY #1 ← CACHE INDEX | | | | | | |
| | ... | ... | ... | ... | ... | ... |
| ENTRY #M | | | | | | |

CACHING SYSTEM USING CACHE INDEXES FOR CALL GROUP DATA OF CALL REQUESTS IN ATM NETWORK DEVICES

FIELD OF THE INVENTION

The present invention relates generally to data communications networks and more particularly relates to a signaling cache suitable for use on network switches such as Asynchronous Transfer Mode (ATM) switches.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

ATM Signaling

An ATM network is basically divided into two types of entities: users and network element (namely switches). Users can be stations directly connected to the ATM network, edge devices connected to the ATM network, etc. Users request that connections to other users be established using a signaling process. The signaling process occurs between the user and the ATM switch it is connected to via a User to Network Interface (UNI). The switches communicate between themselves via a Network to Network Interface (NNI).

When the user desires to establish a connection, it constructs a request message which includes all the information necessary for establishing the call. In addition, a call reference number is generated which is associated with that particular call. If in the future, the user desires to establish a call to the same destination and having similar call characteristics, the same request message is constructed again but this time a different call reference number is generated.

The ATM switch receiving the request message (termed a SETUP message) functions to parse the message and analyze its contents. The destination is read from the message and a route to the destination is calculated. In addition, resources are allocated using Connection Admission Control (CAC) functions which determine whether a virtual circuit (VC) connection request should be accepted or rejected. The same call request generated previously is then forwarded toward the destination but with a different call reference number. Note that the call reference number is allocated by the local originator of the call request message. Each hop along the route is the local originator for the next hop switch on the call route.

A disadvantage of this scheme is that the processor in the call control portion of the network device on both the user side and the network side may be called on to process essentially the same call request many times. Although the originator of the call requests a call having the same call characteristics but with different call reference numbers, the user device and the ATM switch on the network side perform the same processing again and again regardless of the fact that the processing results are the same.

This is very wasteful in terms of time and processing resources. A case may arise whereby a large amount of calls need to be setup on a periodic basis. For example, the eight o'clock problem arises when large numbers of users log onto the network at the same time. In this case, large numbers of connections are required to be established at the same time. This overburdens the edge devices and results in processing and call establishment delays.

SUMMARY OF THE INVENTION

The present invention overcomes the problems and disadvantages of the prior art by providing a signaling cache suitable for use in any network that utilizes signaling in establishing calls. The signaling cache functions to store the processing results in a cache memory that were obtained in response to the first signaling request message having a particular set of characteristics. Anytime thereafter, if a signaling request having the same characteristics is received, the signaling process is bypassed and the results are fetched from the cache memory. Note that one skilled in the telecommunication arts can apply the present invention to other related processes such routing, resource allocation, etc.

In accordance with the present invention, each switch along the call route functions to perform signaling processing only once for each unique call request. The results of the signaling processing are stored in a cache memory to enable re-use in the event a call request is that matches a previously and processed call request. Signaling processing is performed for each request message having a particular set of characterics, e.g., a set of IEs having a particular value. Anytime thereafter, when a signaling request having the same characteristics is received, the signaling process is bypassed and the results fetched from the cache memory. The signaling cache of the present invention can be applied to other related processes including routing, resource allocation, etc.

There is provided in accordance with the present invention a caching system for use in network devices for reducing the processing burden of call request messages received by a second network device from a first network device, the caching system comprising a first cache in the first network device, the first cache for storing a plurality of first cache indexes, each first cache index having a call group data set associated therewith, a second cache in the second network device, the second cache for storing a plurality of second cache indexes, each second cache index having processing results data and a plurality of third cache indexes associated therewith, means for generating and storing in the cache, a first cache index for each call request having a unique call group value, and for sending the first cache index with the call request to the second network device, means for determining whether the call request has been previously received and if so, retrieving the processing results data corresponding to the first cache index from the second cache and means for storing processing results data in the second cache in the event the call request is the first to be received having such a call group value.

The caching system further comprises means for storing the plurality of third cache indexes in the second cache wherein a third cache index is associated with each port in the second network device and means for sending a third cache index along with a call request message generated by the second network device and sent to a next hop network device.

The first cache comprises a cache database for storing a cache index/null indication and signaling results data and a cache control for managing the cache database and for processing read and write queries received by the first cache. The second cache comprises a cache database for storing cache indexes and related data and a cache control for managing the cache database and for processing read and write queries received by the second cache.

The call group comprises one or more information elements used to determine whether one call request matches another call request resulting in a cache hit and the processing results data comprises the results of signaling processing performed by a signaling module. The caching system further comprises means for generating a call reference number based on a cache index and based on a cache index value concatenated with a suffix, wherein the suffix is unique within a particular cache index value. The caching system further comprises means for clearing an entry in the second cache.

The means for clearing comprises setting a clear flag bit in a call reference number generated by the first network device sent as part of a call request message and the means for clearing comprises setting an indication in an information element sent as part of a call request message.

BRIEF DESCRIPTION OF THE DRAWINGS

The invention is herein described, by way of example only, with reference to the accompanying drawings, wherein:

FIG. 2 is a diagram illustrating the format of the cache database on the ATM edge device;

FIG. 3 is a diagram illustrating the format of the cache database on the ATM switch;

DETAILED DESCRIPTION OF THE INVENTION

Notation Used Throughout

The following notation is used throughout this document.

| Term | Definition |
|---|---|
| AAL | ATM Adaptation Layer |
| ANSI | American National Standards Institute |
| ATM | Asynchronous Transfer Mode |
| CAC | Connection Admission Control |
| CCITT | Comite Consulatif International Telegraphique et Telephonique |
| CRC | Cyclic Redundancy Check |
| CS | Convergence Sublayer |
| FDDI | Fiber Distributed Data Interface |
| IE | Information Element |
| ITU | International Telecommunications Union |
| ITU-T | International Telecommunications Union-Telecommunications Standards Sector |
| LAN | Local Area Network |
| LANE | LAN Emulation |
| NE | Network Element |
| NNI | Network to Network Interface |
| PHY | Physical Layer |
| PM | Physical Medium |
| QoS | Quality of Service |
| SAAL | Signaling ATM Adaptation Layer |
| SAR | Segmentation and Reassembly |
| SSCF | Service Specific Coordination Function |
| SSCOP | Service Specific Connection Oriented Protocol |
| TC | Transmission Convergence |
| UNI | User to Network Interface |
| UPC | Usage Parameter Control |
| VC | Virtual Circuit |
| VCI | Virtual Circuit Identifier |
| VPI | Virtual Path Identifier |

General Description

The present invention is a signaling cache suitable for use in any network that utilizes signaling in establishing calls. The signaling cache is particularly applicable to ATM networks which is the example chosen throughout this document to illustrate the principles of the present invention. The signaling cache comprises two portions: a user side portion and a network side portion. The invention functions to greatly reduce the amount of call processing required on the network side for calls that have been previously received and processed by the switch. The signaling cache can be implemented on each switch in the network to reduce the processing requirements network wide.

In accordance with the present invention, each switch along the call route functions to perform signaling processing only one for each unique call request. The results of the signaling processing are stored in a cache memory to enable re-use in the event a call request is receive that matches a previously received and processed call request. Signaling processing is performed for each request message having a particular set of characteristics, e.g., a set of IEs having a particular value. Anytime thereafter, when a signaling request having the same characteristics is received, the signaling process is bypassed and the results are fetched from the cache memory. The signaling cache of the present invention can be applied to other related processes including routing, resource allocation, etc.

Figure 1:
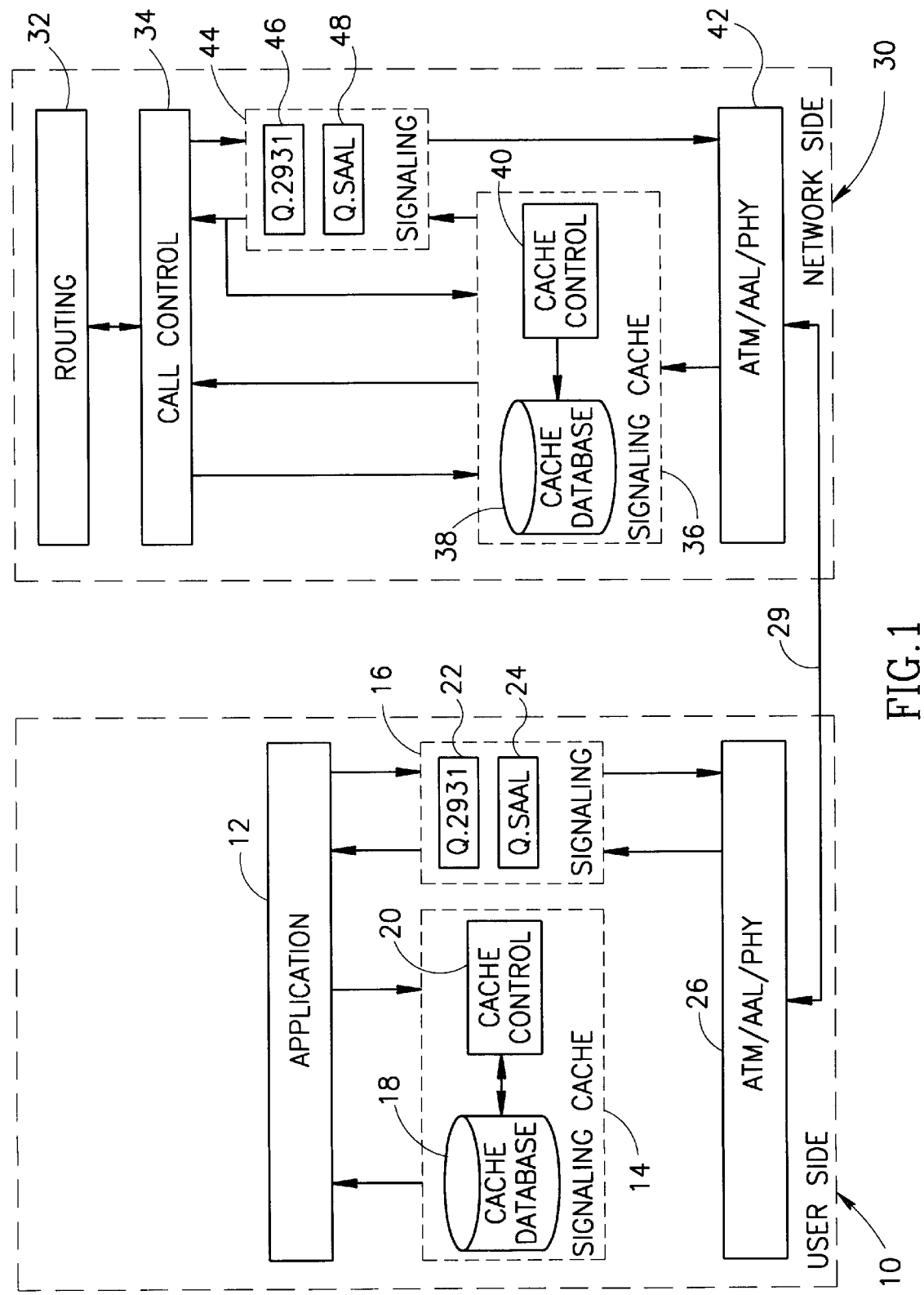
FIG. 1 is a block diagram illustrating the edge device and the network switch with the signaling cache of the present invention integrated into both devices.

A block diagram illustrating the edge device and the network switch with the signaling cache of the present invention integrated into both devices is shown in FIG. 1. A user side 10 is connected to the network side 30 via a physical link 29. An application 12 communicates with the signaling cache 14 and the signaling module 16. The application transmits requests over the lower ATM layers 26 via the signaling module 16 and receives request from the lower ATM layers via the signaling 16.

The signaling module 16 comprises the software that provides the signaling functionality required to send and receive call requests over the ATM network. The two components shown are the Q.2931 standard 22 and the Q.SAAL standard 24. The Q.2931 is the ITU-T recommendation for providing SVC specifications and standards. The Q.SAAL is the ITU-T standard providing the Signaling ATM Adaptation Layer (SAAL) which is a collection of standardized protocols for adapting user traffic to a cell format. It includes ITU-T recommendations for specifying the UNI Service Specific Connection Oriented Protocol (SSCOP) and the UNI Service Specific Coordination Function (SSCF). The SSCF forms part of the Convergence Sublayer of the ATM Adaptation Layer (AAL) that is particular to the traffic service class to be converted. It has application to, for example, LAN Emulation (LANE) and high quality video transmission. The SSCOP is part of the SAAL that functions to provide a clear interface for relaying user data and providing independence from the underlying layers.

In addition, the Q.2931 standard is responsible for building the signaling messages that are transmitted over the network. For example, the setup request and other call processing related messages. The Q.SAAL layer is responsible for encoding and decoding message between the upper layers and the lower ATM layers.

The lower ATM layers 26 comprise the ATM layer, the AAL layer and the ATM physical layer. The ATM layer is the second layer of the ATM protocol stack model that constructs and processes the ATM cells. It also functions to provide Usage Parameter Control (UPC) which is a form of traffic control that checks and enforces user's conformance with the traffic contract and the Quality of Service (QoS) class parameters.

The ATM Adaptation Layer (AAL) is a collection of protocols that adapts user data to a cell format. The AAL is divided into two sublayers: the Convergence Sublayer (CS) and the Segmentation and Reassembly (SAR) sublayer. For example, the AAL protocol handles coding and decoding of CRC numbers, padding and de-padding of cells, VPI/VCI multiplexing and demultiplexing which functions to associate VPI/VCI pairs with upper layer applications.

The physical (PHY) layer is the bottom layer of the ATM protocol reference mode and is subdivided into two sublayers: Transmission Convergence (TC) and Physical Medium (PM). The PHY layer provides transport of ATM cells over physical interfaces that interconnect the ATM devices. The TC sublayer is responsible for adapting ATM cells into a stream of bits to be carried over the physical medium. The PM sublayer provides the bit timing and perform the actual transmission of the bits over the physical medium.

The signaling cache 14 comprises a cache controller 20 and cache database 18. The cache control interfaces to the application and manages writing to and reading from the cache database.

The network side 30 comprises the lower ATM layers 42, signaling cache 36, signaling module 44, call control module 34 and a routing module 32. The signaling module 44 comprises a Q.2931 module 46 and Q.SAAL module 48 which function similarly to those in the signaling module 16. The signaling cache 36 comprises a cache control 40 and a cache database 38. The signaling module is the only entity in the switch that understands the signaling protocols as set out in the ATM UNI standards, e.g., both Version 3.0 and Version 4.0 which have been approved. It is also the signaling module that is typically the bottleneck due to the 'heavy' protocols that must be run for every call process. The processing associated with the signaling is often more resource intensive that that required for routing.

The processing associated with signaling is typically complex and the most widely requested process in the switch. The signaling process must handle a large number of calls with each call requiring numerous messages going back and forth between source, destination and the intermediate transit nodes along the path. This places a heavy burden on the signaling process in terms of processing resources and processing time.

The call control module 34 functions to provide the administration, management and control of the call process and the configuration of the switch. In addition, it interfaces with the routing module 32 in determining the next hop along the route. In a conventional switch, once the next hop is determined, the call control sends a call request to the signaling which then builds the message to be sent to the lower ATM layers. In addition, the call control allocates resources and configures the switch hardware in response to information received from the signaling.

In a conventional edge device or end user device, when the application 12 desires to establish a connection, it passes various information elements such as called party number (destination), call reference number, QoS request, bandwidth request, etc. to the signaling module. The various information elements that comprise a call setup request are outlined in detail in the UNI 3.0 specification. In the present invention, however, the call request is sent from the application to the signaling cache 14 instead. Note that the use of the caching is optional on a call by call basis.

Assuming the application has decided to utilize the caching system of the present invention, the application sends the call request to the signaling cache 14. The cache checks its database for a similar entry. If one is found, its associated cache index is returned to the application which uses it in generating the call reference number for the call. The cache index is used by the switch to determine whether a similar call has already been received and processed.

A diagram illustrating the format of the cache database on the ATM edge device is shown in FIG. 2. In accordance with the present invention, the cache 14 functions to store a call group that contains all the IEs that are examined in determining whether a cache hit has occurred. The contents of a call group are variable in that it is up to the implementor to determine which types of data are to analyzed in determining a match in the database. Preferably, at a minimum, the called party number, i.e., the destination ATM address, should be part of the call group. In addition, the QoS parameters may be part of the call group. Alternatively, any IE or other parameter associated with a call can be part of the call group.

The table 50 represents a call group having a plurality of IEs. The table comprises a plurality of entries labeled entry #1 through entry #M. Each entry comprises a plurality of IEs labeled IE #1, IE #2 through IE #N. In addition, each entry comprises a cache index. Each entry represents a call having a set of IEs with a particular set of values. Each entry is unique differing from the other entries by at least one IE. Each unique call entry has a cache index associated with it.

A diagram illustrating the format of the cache database on the ATM switch is shown in FIG. 3. The format of the cache database 38 also is as shown in table 60 which comprises a plurality of entries labeled entry #1 through entry #M. Each entry comprises a cache index/null field, signaling processing results field and a plurality of cache indexes each associated with one of the ports on the switch. Thus, a switch containing N ports has N cache indexes columns in its table. Note that the cache database comprises a separate table 60 for each port in the switch.

The cache index/null field indicates whether the entry is valid or not, meaning whether the entry contains cache data or is null. A null value indicates that the entry is empty. A non null value indicates that signaling results have been stored in the table. The signaling processing results field stores the output of the signaling module 44 that is input to the call control 34. The data stored in the table is the results of the signaling processing performed in response to a call request from an input port. After the signaling results are stored for a call having a particular call group set of values, the signaling process can be bypassed with the consequent huge savings in processing resources and time consumption.

The use of the cache database in the user device and the switch will be described in more detail hereinbelow.

Figure 4:
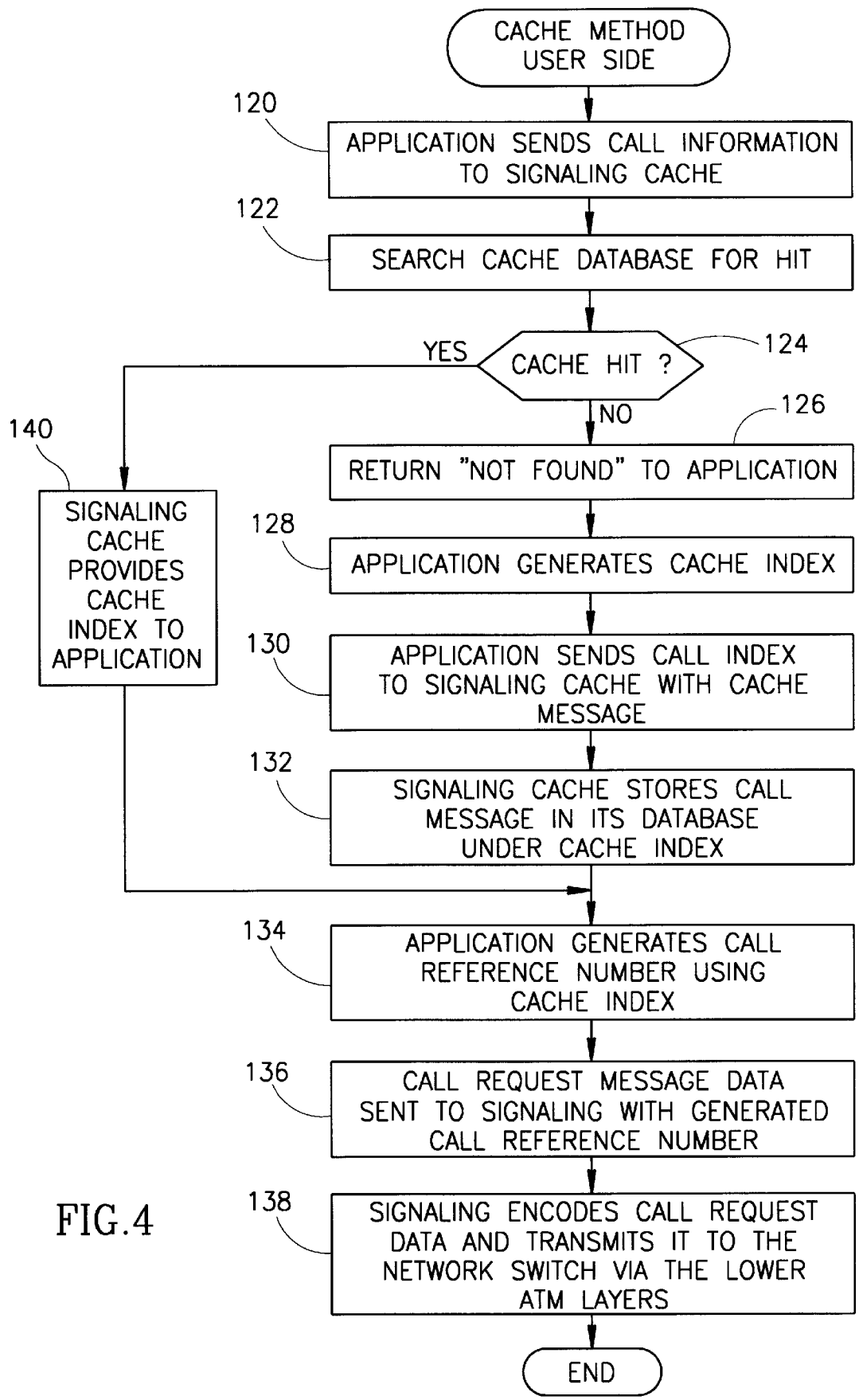
FIG. 4 is a flow diagram illustrating the user portion of the signaling cache method of the present invention.

A flow diagram illustrating the user portion of the signaling cache method of the present invention is shown in FIG. 4. With reference also to FIG. 1, as described previously, the application 12 decides to establish a connection using the signaling cache of the present invention. It thus sends the pertinent call related information to the signaling cache (step 120). The cache control 20 checks in the database 18 for an entry whose IE values exactly match those of the requested call (step 122). Each of the N IEs for an entry must match the corresponding IEs in the call request data. If a cache hit occurs (step 124), the corresponding cache index is read from the database and passed to the application (step 140).

If, however, no match is found in the database, a message indicating 'call not found' is returned to the application (step 126). In response, the application generates a new cache index (step 128). Note that the range for the value of the cache index corresponds to the number of entries M in table 50 (FIG. 2).

After generating the cache index, the application sends the call request data with the newly generated cache index to the signaling cache (step 130). Note that of the call request data, only the data corresponding to the IEs in the call group need to be stored in the signaling cache.

The signaling cache then stores the received call request data in the entry corresponding to the cache index in the cache database 18 (step 132). The cache index/null field is set to a non null value indicating valid data is stored for this entry. The application then generates a call reference number (step 134). The call reference number is constructed by concatenating cache index with a suffix portion. Calls having the same call group values are assigned the same cache index. The suffixes, however, are generated to be unique for a particular cache index. Thus, a plurality of unique suffixes may be generated for the same cache index. Each call reference number generated in thus unique.

The call request data including the generated call reference number is sent to the signaling module 16 (step 136). The signaling module functions to encode the call request data to generate a call request message understandable by the lower ATM layers 26. The call request message is transmitted over the physical link to the switch (step 138).

Figure 5:
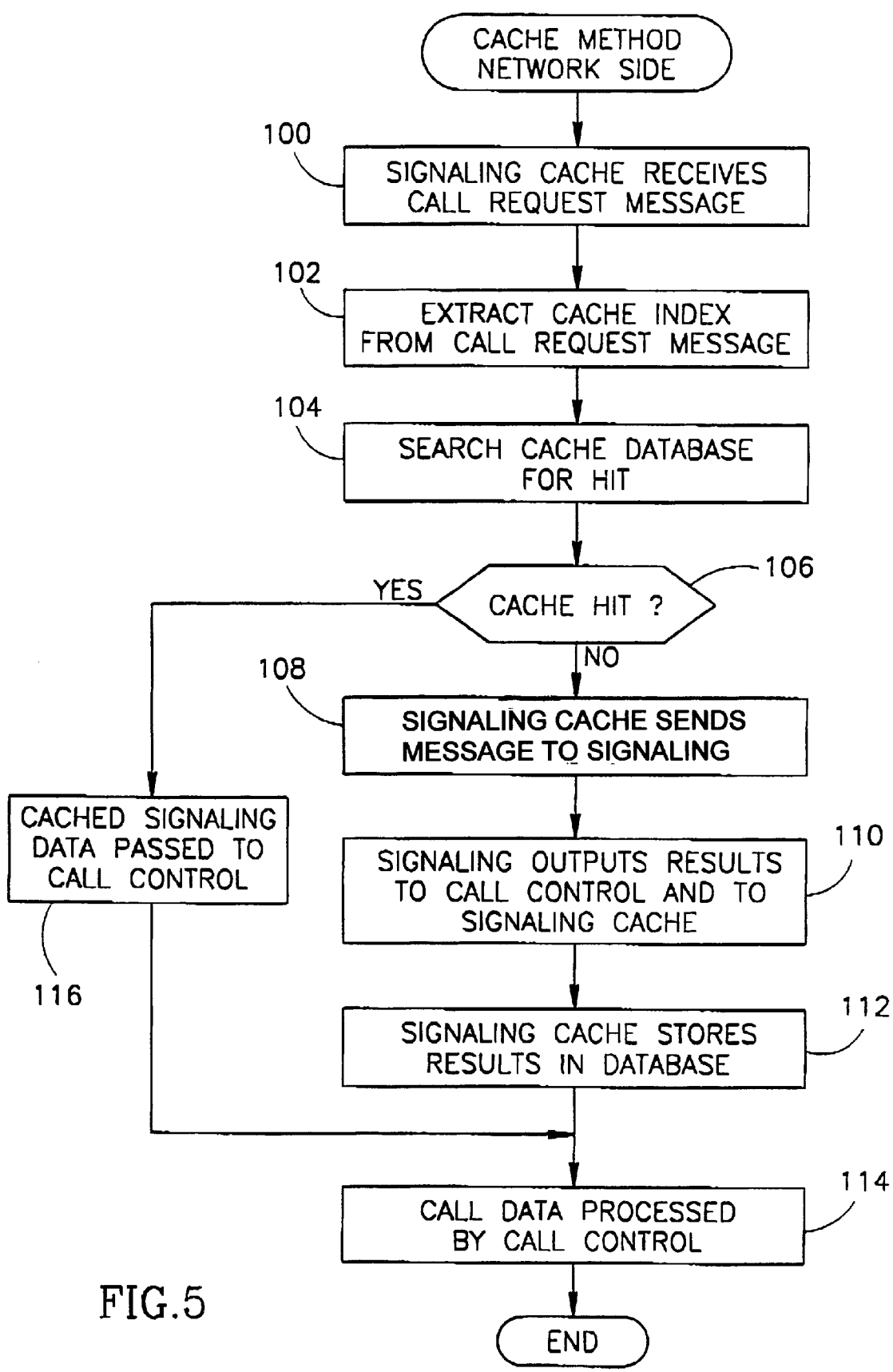
FIG. 5 is a flow diagram illustrating the network portion of the signaling cache method of the present invention.

A flow diagram illustrating the network portion of the signaling cache method of the present invention is shown in FIG. 5. Messages received by the lower ATM layers 42, including call request messages, are intercepted by the signaling cache 36 (step 100). The cache control 40 extracts the cache index from the call reference number in the message (step 102) and searches the cache database 38 for a match (step 104). The entry in the cache database pointed to by the cache index of the received call request message is checked for a non null value in the cache index/null field (FIG. 3). If a cache hit occurs, i.e., the cache index/null field in non null (step 106), the signaling results data previously stored in the cache are retrieved and passed to the call control 34 (step 116).

If a match is not found, the signaling cache 36 forwards the call request message to the signaling module 44 (step 108). The signaling module processes the call request message in accordance with the Q.SAAL and Q.2931 specifications and sends the decoded processed results to the call control 34 and to the signaling cache 36 (step 110). In response to receiving the processed results from the signaling module, the signaling cache stores the results in the cache database 38 in the entry pointed to by the cache index (step 112). The processed signaling results are stored and the corresponding cache index/null field is set to non null indicating a valid cache entry. The processed results are then input to and processed by the call control module 34 (step 114).

Figure 6A:
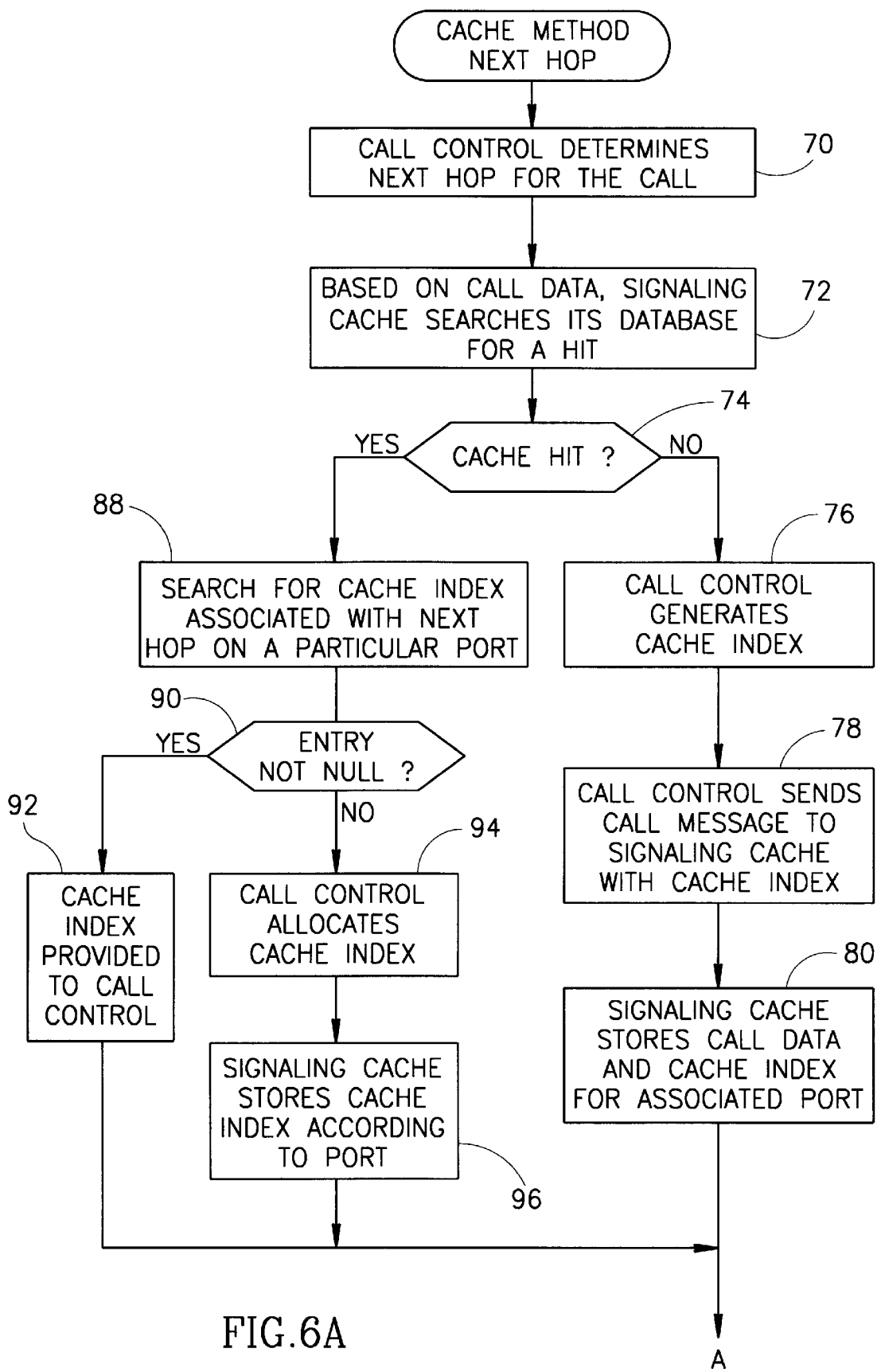
FIGS. 6A and 6B is a flow diagram illustrating the next hop portion of the signaling cache method of the present invention.
Figure 6B:
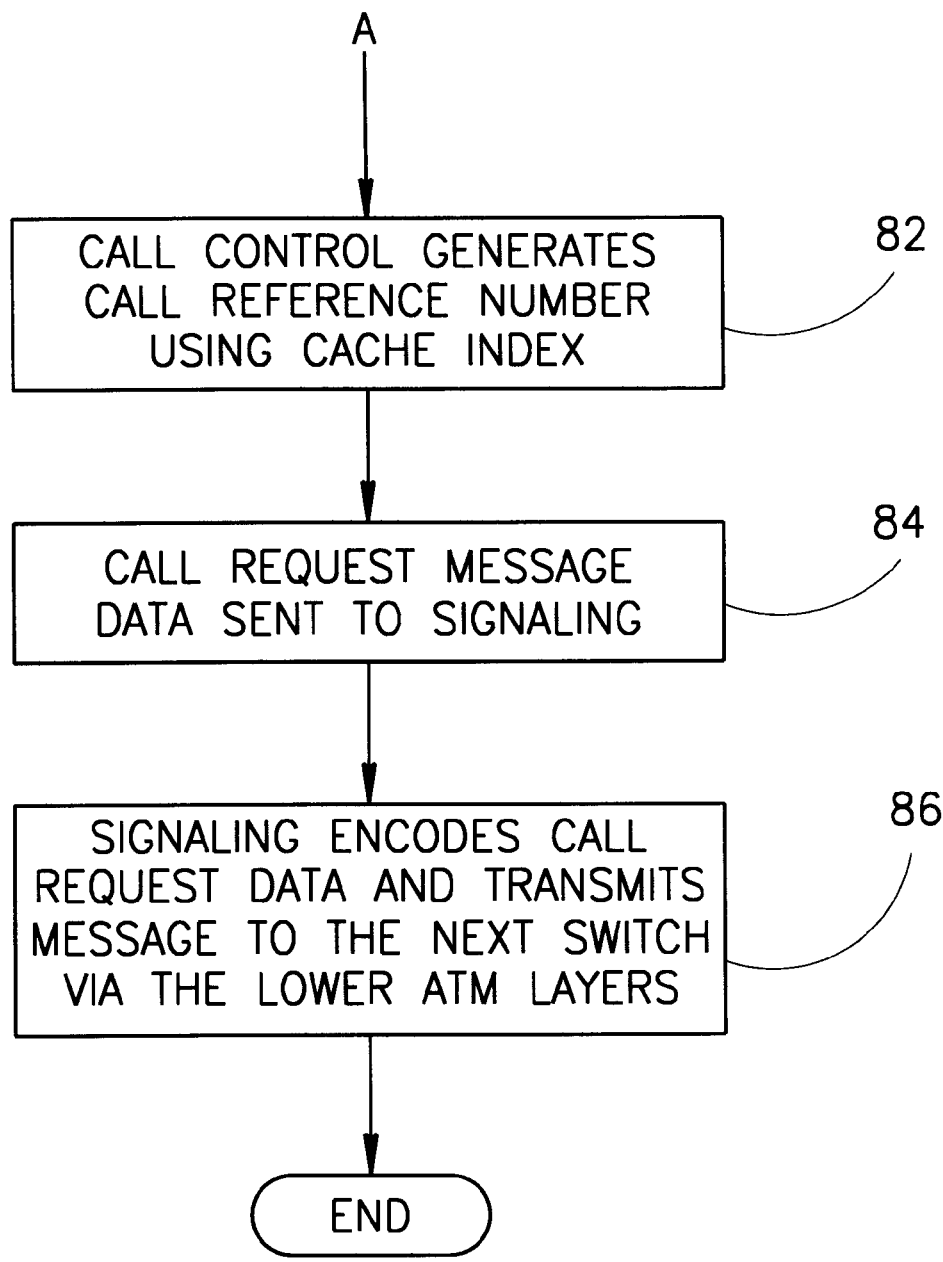

A flow diagram illustrating the next hop portion of the signaling cache method of the present invention is shown in FIGS. 6A and 6B. In response to the results of the signaling processing, regardless of whether received from the cache or not, the call control determines the next hop to forward the call request message (step 70). Note that the signaling cache of the present invention operates regardless of the type of routing performed in the network, e.g., source routing or hop by hop routing.

Once the destination for the next hop is determined, possibly using routing module 32, the call control module 34 generates a request to the signaling cache 36 to retrieve the processing results using the same cache index in the corresponding received call request message (step 72). If the cache index/null field of the entry pointed to by the cache index is not null than a cache hit occurs (step 74). If the call request was previously issued then signaling processing can be saved on the next hop switch by sending the cache index along with the call request. Note that this caching process is repeated between each pair of switches along the routing path.

The search of the cache database is only performed on the particular table 60 (FIG. 3) associated with the destination port leading to the next hop. If a match is found (step 74), the cache index fields in the database entry are examined to see if there is a cache index associated with the destination port number, meaning that a similar call request message was already sent to the next hop switch on that particular port (step 88). If a cache index was found (cache hit) under that port number (step 90), the cache index is provided to the call control (step 92).

If the cache index was not found (no cache hit) (step 90), the call control module is notified and, in response, allocates a cache index (step 94) and sends it to the signaling cache. The signaling cache stored the cache index its cache database in the table corresponding to the port number. Within the table, the cache index is stored under that destination output port (step 96). The method continues with step 82.

If a match was not found (step 74), the call control module generates a cache index (step 76). The call control module then sends the call setup message with the cache index to the signaling cache (step 78). The signaling cache stores the call data in the signaling processing results field and stores the cache index in under the appropriate port (step 80). Note that the situation whereby a switch along a routing path would not have a cache hit for a call setup request that it just received from a downstream switch where the destinations are the same.

In the next step, the call control module generates a call reference number using the cache index (step 82). The call reference number is constructed by concatenating cache index with a suffix portion. Calls having the same call group values are assigned the same cache index. The suffixes, however, are generated to be unique for a particular cache index. Thus, a plurality of unique suffixes may be generated for the same cache index. Each call reference number generated is thus unique.

The call request message data is then sent to the signaling module 44 (step 84). The signaling module functions to encode the request data and generate a call request message. The resultant call request message is transmitted to the next switch via the lower ATM layers (step 86).

In addition, the cache of the present invention provides the capability to clear any arbitrary entry in the cache database of another device. For example, an end station can instruct the next hop switch to clear the cache index from its cache database. A device may desire to clear an entry in the cache database for a variety of reasons. For example, an end station may desire to clear an entry in the cache database in order to use the space for other purposes or for other calls in the event the cache becomes full.

To clear and entry from the cache database, a flag (a clear flag) is set in the call reference number that is separate from the cache index and suffix portion of the number. The flag is interpreted by the device that receives the call reference number as a command to clear a cache database entry regardless of the fact a cache hit may have occurred. The entry is cleared before the current call data is stored therein. The flag is sent along with the call request message. Note that alternatively, the clear flag can be transmitted to the next hop device via a separate information element rather than as a flag bit in the call reference number.

While the invention has been described with respect to a limited number of embodiments, it will be appreciated that many variations, modifications and other applications of the invention may be made. For example, the cache databases may be implemented as block arrays in memory or as linked lists. In addition, the cache index may be embodied in a separate information element rather than concatenated with the suffix to form the call reference number.

What is claimed is:

1. A caching system for use in network devices for reducing the processing burden of call request messages received by a second network device from a first network device, said caching system comprising:

a first cache in said first network device, said first cache for storing a plurality of first cache indexes, each first cache index having a call group data set associated therewith;

a second cache in said second network device, said second cache for storing a plurality of second cache indexes, each second cache index having processing results data and a plurality of third cache indexes associated therewith;

means for generating and storing in said first cache a new first cache index for each call request having a unique call group value, and for sending said new first cache index with said call request to said second network device;

means for determining whether said call request has been previously received and if so, retrieving from said second cache the processing results data corresponding to the first cache index for said call request; and means for storing processing results data in said second cache in the event said call request is the first to be received having such a call group value.

2. The caching system according to claim 1, further comprising:

means for storing said plurality of third cache indexes in said second cache wherein a third cache index is associated with each port in said second network device;

and means for sending said third cache index along with a call request message generated by said second network device and sent to a next hop network device.

3. The caching system according to claim 1, wherein said first cache comprises:

a cache database for storing a cache index/null indication and signaling results data;

and a cache control for managing said cache database and for processing read and write queries received by said first cache.

4. The caching system according to claim 1, wherein said second cache comprises:

a cache database for storing cache indexes and related data; and a cache control for managing said cache database and for processing read and write queries received by said second cache.

5. The caching system according to claim 1, wherein said call group comprises one or more information elements used to determine whether one call request matches another call request resulting in a cache hit.

6. The caching system according to claim 1, wherein said processing results data comprises the results of signaling processing performed by a signaling module.

7. The caching system according to claim 1, further comprising means for generating a call reference number based on a cache index.

8. The caching system according to claim 1, further comprising means for generating a call reference number based on a cache index value concatenated with a suffix, wherein said suffix is unique within a particular cache index value.

9. The caching system according to claim 1, further comprising means for clearing an entry in said second cache.

10. The caching system according to claim 9, wherein said means for clearing comprises setting a clear flag bit in a call reference number generated by said first network device sent as part of a call request message.

11. The caching system according to claim 9, wherein said means for clearing comprises setting an indication in an information element sent as part of a call request message.

* * * * *